United States Patent
Chen et al.

(10) Patent No.: US 7,083,302 B2
(45) Date of Patent: Aug. 1, 2006

(54) WHITE LIGHT LED ASSEMBLY

(75) Inventors: Wen-Ho Chen, Hsin Chu (TW); Hui Yen Huang, Hsin Chu (TW); King Chang Chang, Hsin Chu (TW); Chia-Feng Lin, Tai Chung (TW)

(73) Assignee: J. S. Technology Co., Ltd., Hsin Chu (TW)

( * ) Notice: Subject to any disclaimer, the term of this patent is extended or adjusted under 35 U.S.C. 154(b) by 235 days.

(21) Appl. No.: 10/807,107

(22) Filed: Mar. 24, 2004

(65) Prior Publication Data

US 2005/0212404 A1    Sep. 29, 2005

(51) Int. Cl.
    *F21V 9/00* (2006.01)
(52) U.S. Cl. .................. 362/231; 362/612; 257/89
(58) Field of Classification Search ........... 362/231, 362/612; 257/89
    See application file for complete search history.

(56) References Cited

U.S. PATENT DOCUMENTS

| | | | |
|---|---|---|---|
| 6,513,949 B1 * | 2/2003 | Marshall et al. | 362/231 |
| 6,841,804 B1 * | 1/2005 | Chen et al. | 257/98 |
| 7,005,679 B1 * | 2/2006 | Tarsa et al. | 257/89 |
| 7,008,078 B1 * | 3/2006 | Shimizu et al. | 362/231 |
| 2004/0245532 A1 * | 12/2004 | Maeda et al. | 257/89 |
| 2005/0157515 A1 * | 7/2005 | Chen et al. | |

* cited by examiner

*Primary Examiner*—Ali Alavi
*Assistant Examiner*—Hargobind S. Sawhney
(74) *Attorney, Agent, or Firm*—Rosenberg, Klein & Lee

(57) ABSTRACT

A white light LED assembly has at least two kinds of light-emitting units. The units can be a white light-emitting unit composed of red, green and blue LEDs, a white light-emitting unit composed of a blue and yellowish-green LEDs, a white light-emitting unit composed of a blue LED and yellow phosphor, or a white light-emitting units composed of UV LED and red, green and blue phosphors. The white light LED assembly according to the present invention has satisfactory efficiency and color rendering property as well as flexible phosphor usage.

8 Claims, 6 Drawing Sheets

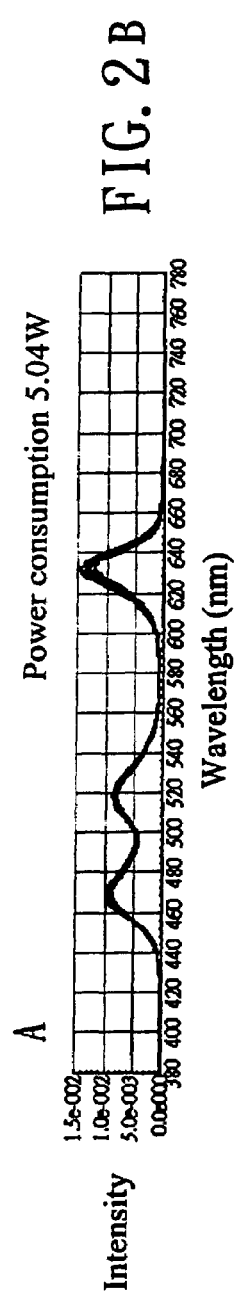
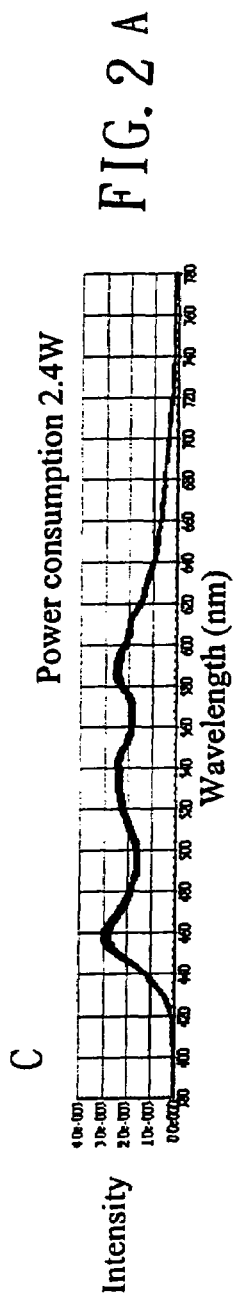
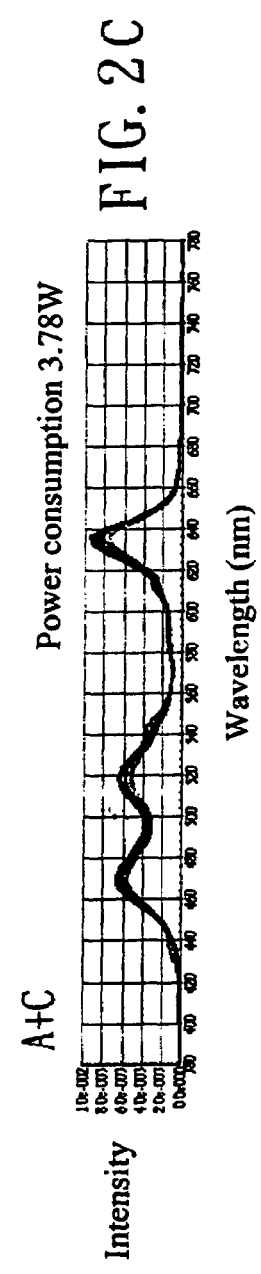

WHITE LIGHT LED ASSEMBLY

FIELD OF THE INVENTION

The present invention relates to a white light LED assembly, especially to a white light LED assembly with satisfactory efficiency and color rendering property as well as flexible phosphor usage.

BACKGROUND OF THE INVENTION

A white light source is generally provided by mixing light sources of different wavelengths. For example, a conventional white light source can be realized by mixing red light, green light and blue light with a suitable intensity ratio. Alternatively, the white light source can be realized by mixing yellow light and blue light with a suitable intensity ratio. The conventional method for manufacturing a white light source are summarized in the following.

In a first prior art white light source, three LED dies based on InGaAlP, InGaN and Gap are packaged into a lamp and emit red light, blue light and green light, respectively. The light emitted from the lamp can be mixed by a lens to provide white light.

In a second prior art white light source, two LED dies based on InGaN (or AlInGaP) and Gap emit blue light and yellowish-green light. The blue light and yellowish-green light are mixed to provide white light.

A third prior art white light source is proposed by Nichia Chemical Co. An InGaN based blue LED and a yellow YAG phosphor are used to provide the white light source. This white light source requires a single color LED to provide white light. Moreover, the phosphor is a mature art and commercially available.

A fourth prior art white light source utilizes UV LED to excite phosphors of blue, green and red color for mixing into white light.

In first and second prior art white light source, LEDs for multiple colors are required. The color of the white light source is distorted if one of the LEDs malfunctions. Moreover, the light emission efficiency is not satisfactory. The second and third prior art white light source employs complementary colors to achieve white light. However, the white light produced in this way is not uniform in spectral distribution (especially in 400 nm–700 nm) as is natural white light such as sunlight. The white light thus produced has relatively poor chroma, which is, even though indistinguishable to human eyes, differentiable to instruments such as a camera. Therefore, the color rendering property and reproducing ability are not satisfactory and this white light source is used mainly for lighting.

In fourth prior art white light source, it is preferable to use three phosphors for emitting three different colors to enhance the color rendering property thereof. However, the phosphors should be prudently chosen to have absorption band matched with the wavelength of the exciting radiation. Moreover, the phosphors should have compatible absorption coefficients and quantum efficiency to provide white light of high quality. These requirements place a strict constraint on the materials of the phosphors.

SUMMARY OF THE INVENTION

It is the object of the present invention to provide a white light LED assembly with satisfactory efficiency and color rendering property as well as flexible phosphor usage.

To achieve the above object, the present invention provides a white light LED assembly comprising at least two kinds of light-emitting units selected from a group consisting of (A) first white light-emitting unit composed of red, green and blue LEDs; (B) second white light-emitting unit composed of blue and yellowish-green LEDs; (C) third white light-emitting unit composed of blue LED and yellow phosphor; and (D) fourth white light-emitting units composed of UV LED and red, green and blue phosphors.

In other word, the white light LED assembly according to the present invention has the following combinations: A+B (A: the first white light-emitting unit composed of red, green and blue LEDs and B: the second white light-emitting unit composed of blue and yellowish-green LEDs), A+C, A+D, . . . , A+B+C, . . . , A+B+C+D. The white light LED assembly according to the present invention has satisfactory efficiency and color rendering property as well as flexible phosphor usage.

BRIEF DESCRIPTION OF DRAWING

The various objects and advantages of the present invention will be more readily understood from the following detailed description when read in conjunction with the appended drawing, in which:

FIGS. 2A, 2B and 2C show the light emission spectrum of three different light sources;

DETAILED DESCRIPTION OF THE INVENTION

Figure 1:
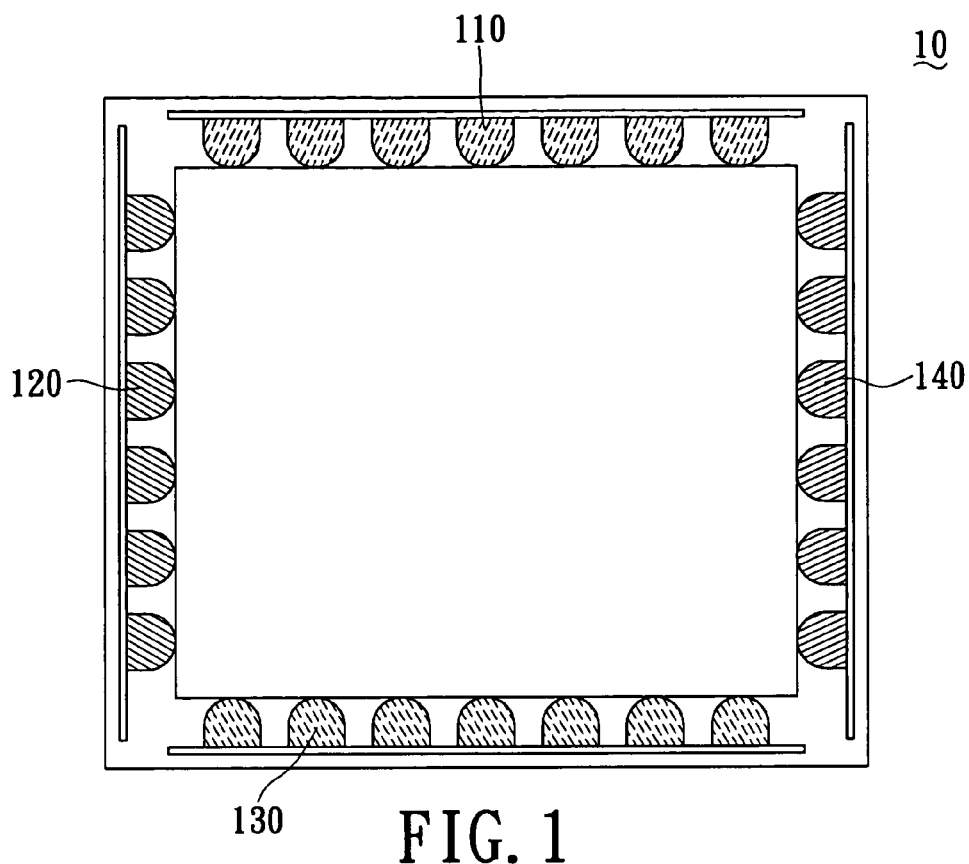
FIG. 1 shows a schematic diagram of a white light LED assembly according to the first preferred embodiment of the present invention.

FIG. 1 shows a schematic diagram of a white light LED assembly 10 according to the first preferred embodiment of the present invention, which is applied to an LCD back light module. The white light LED assembly 10 comprises a plurality of first white light-emitting units 110 composed of red, green and blue LEDs, a plurality of second white light-emitting units 120 composed of blue and yellowish-green LEDs, a plurality of third white light-emitting units 130 composed of blue LED and yellow phosphor, and a plurality of fourth white light-emitting units 140 composed of UV LED and red, green and blue phosphors.

In above demonstrated preferred embodiment, the white light-emitting units can be selected from at least two out of the four light-emitting units. For example, the white light LED assembly 10 can be composed of the first white light-emitting unit 110 (composed of red, green and blue LEDs) and the third white light-emitting unit 130 (composed of blue LED and yellow phosphor). The third white light-emitting units 130 has better light emission efficiency but poor color rendering property. Moreover, the absorption peak of yellow phosphor may not be matched with the emission peak of the blue LED in the third white light-emitting unit 130. The augmentation of the first white light-emitting unit 110 can enhance the color rendering property of the white light LED assembly 10 and provide more flexibility to the selection of yellow phosphor in the third white light-emitting unit 130.

FIGS. 2A, 2B and 2C show the light emission spectrum of the third white light-emitting unit 130 used alone, the first white light-emitting unit 110 used alone and the white light LED assembly 10 composed of the first white light-emitting unit 110 and the third white light-emitting unit 130, respectively. As shown in FIG. 2A, the light emission spectrum of the third white light-emitting unit 130 is insufficient in the red light component. As shown in FIG. 2B, the light emission spectrum of the first white light-emitting unit 110 has a satisfactory color rendering property. However, the light emission efficiency of the first white light-emitting unit 110 is poor. As shown in FIG. 2C, the white light LED assembly 10 has a satisfactory color rendering property and better light emission efficiency than the first white light-emitting unit 110 used alone.

Figure 3:
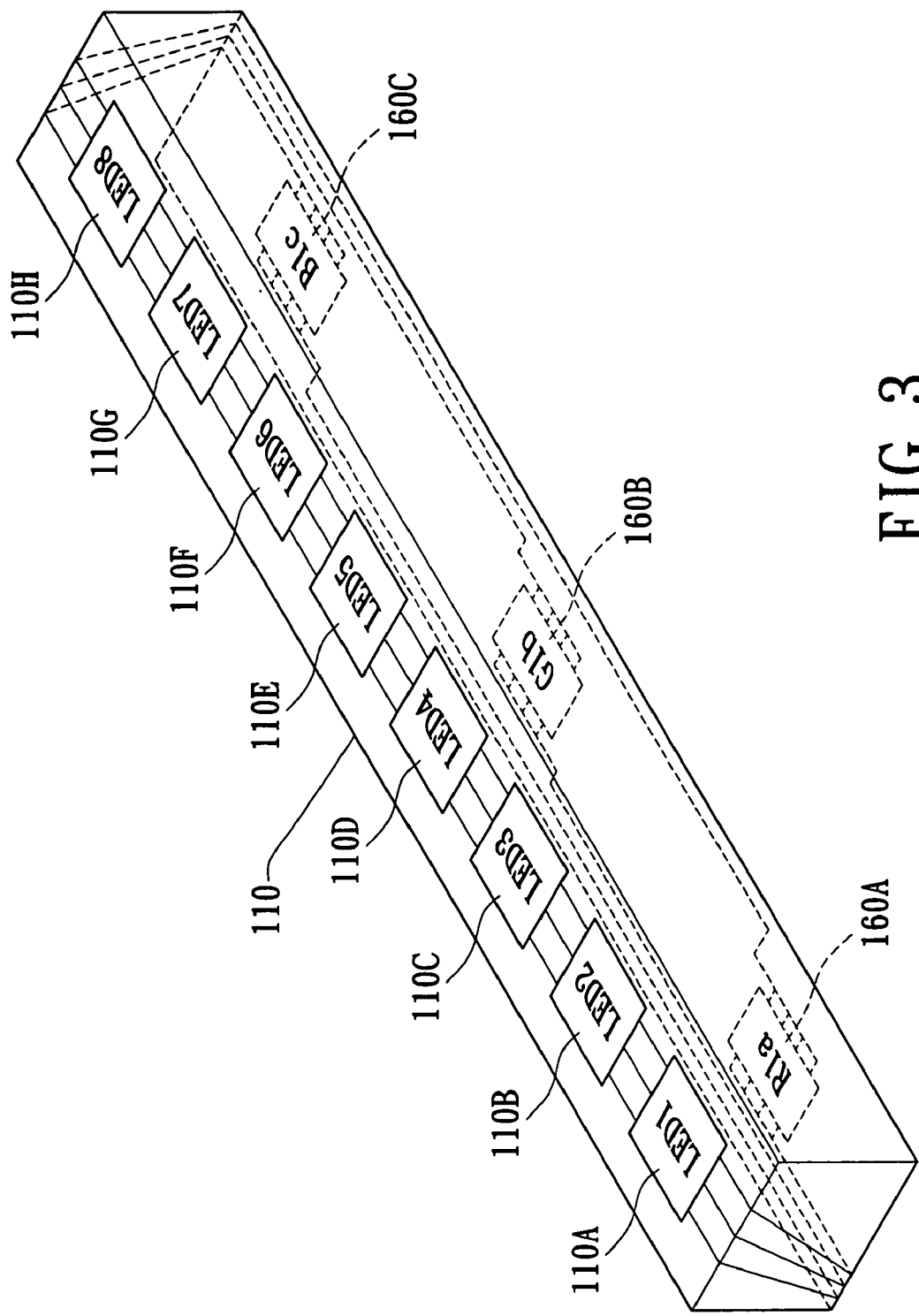
FIG. 3 shows a schematic view of a controller for the white light LED assembly.

To provide more precise control to the color rendering property for the white light LED assembly 10, a controller 160 can be incorporated in the white light LED assembly 10. FIG. 3 shows that a controller 160 is incorporated in the first white light-emitting unit 110 of the white light LED assembly 10. The first white light-emitting unit 110 is composed of a plurality of RGB LED elements 110A–110H electrically connected to red light control section 160A, green light control section 160B and blue light control section 160C of the controller 160.

Figure 4A:
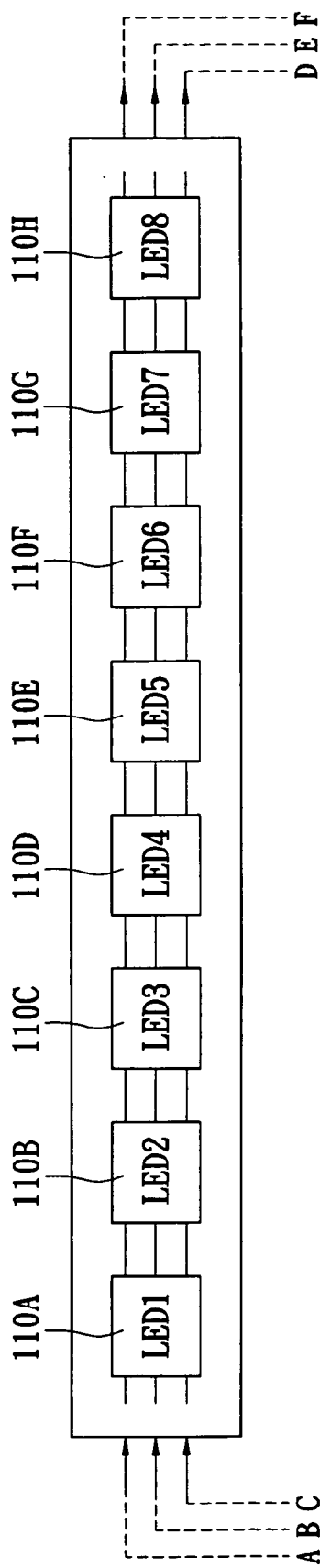
FIGS. 4A and 4B shows a top view and a bottom view of the controller for the white light LED assembly.
Figure 4B:
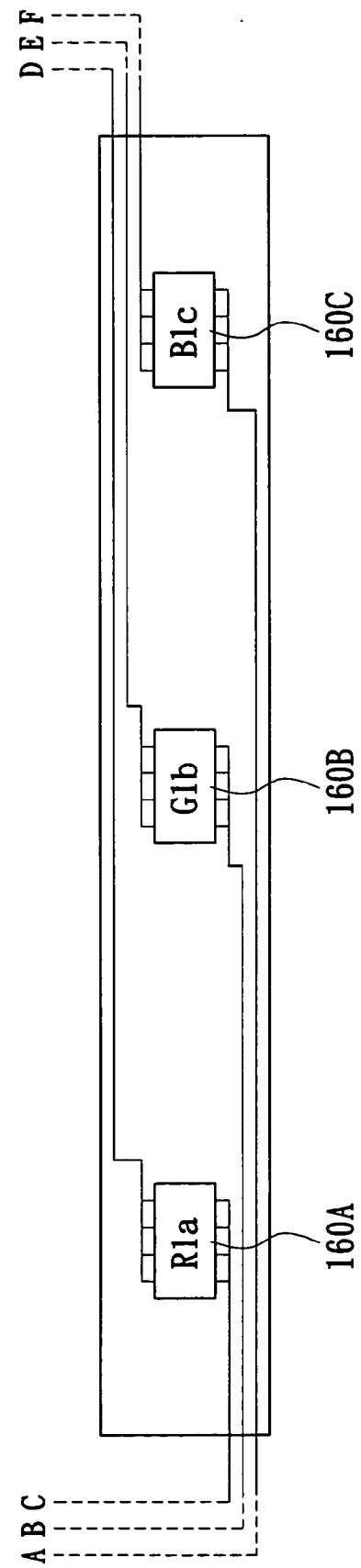

As shown in FIGS. 4A and 4B, the anodes in the LEDs of the RGB LED elements 110A–110H are electrically connected to the corresponding pads of the red light control section 160A, green light control section 160B and blue light control section 160C through the wires A, B and C. The cathodes in the LEDs of the RGB LED elements 110A–110H are electrically connected to the corresponding pads of the red light control section 160A, green light control section 160B and blue light control section 160C through the wires D, E and F. Therefore, the driving current supplied to the LEDs in the RGB LED elements 110A–110H can be controlled by the red light control section 160A, green light control section 160B and blue light control section 160C in the controller 160.

Similarly, a controller (not shown) can also be provided in the third white light-emitting unit 130 to control the color temperature of emitted light.

Figure 5:
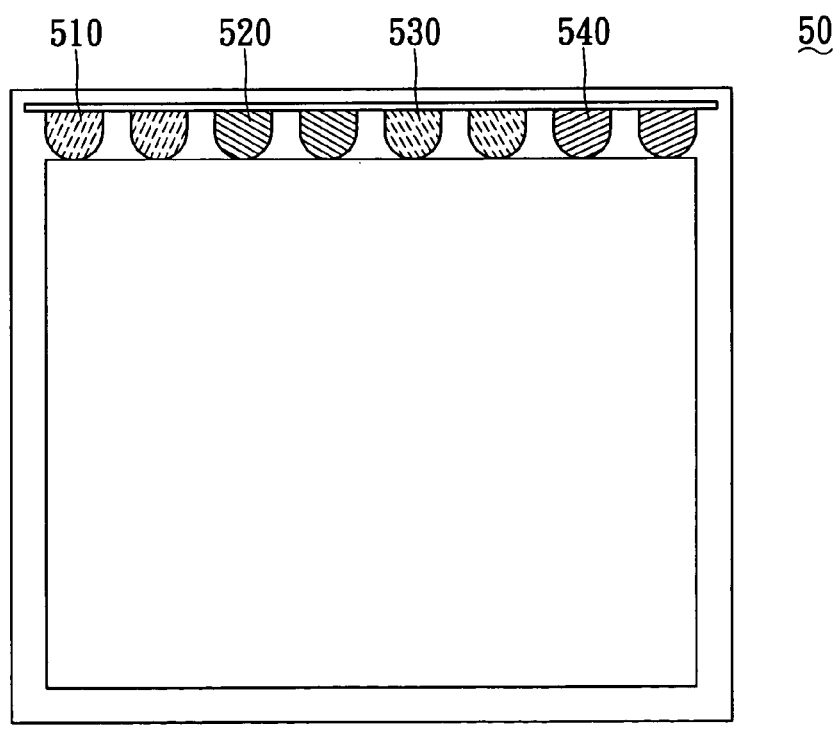
FIG. 5 shows a schematic diagram of a white light LED assembly according to the second preferred embodiment of the present invention.

FIG. 5 is a schematic view showing the application of a white light LED assembly 50 according to the second preferred embodiment of the present invention, wherein a plurality of white light-emitting units are arranged on one side of a backlight panel (not label) rather than arranged in the periphery of a backlight panel. The white light LED assembly 50 comprises a plurality of first white light-emitting units 510 composed of red, green and blue LEDS, a plurality of second white light-emitting units 520 composed of blue and yellowish-green LEDs, a plurality of third white light-emitting units 530 composed of blue LED and yellow phosphor, and a plurality of fourth white light-emitting units 540 composed of UV LED and red, green and blue phosphors. In the above-described preferred embodiment, the white light-emitting units can be selected from at least two out of the four light-emitting units 510–540.

Figure 7:
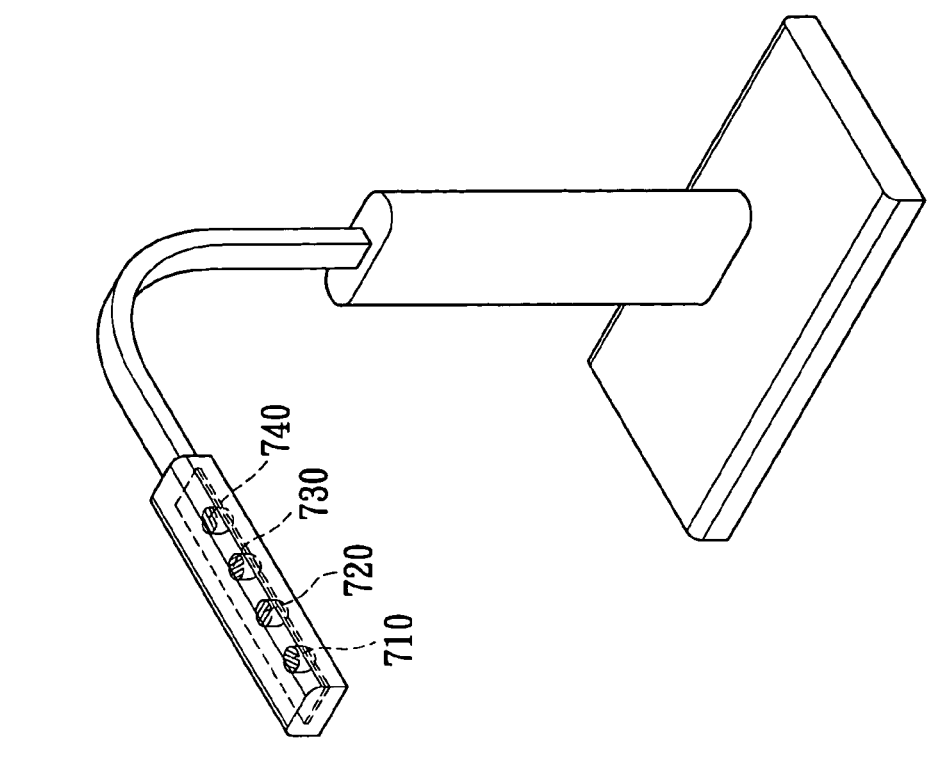
FIG. 7 shows a schematic diagram of a white light LED assembly according to the fourth preferred embodiment of the present invention.
Figure 6:
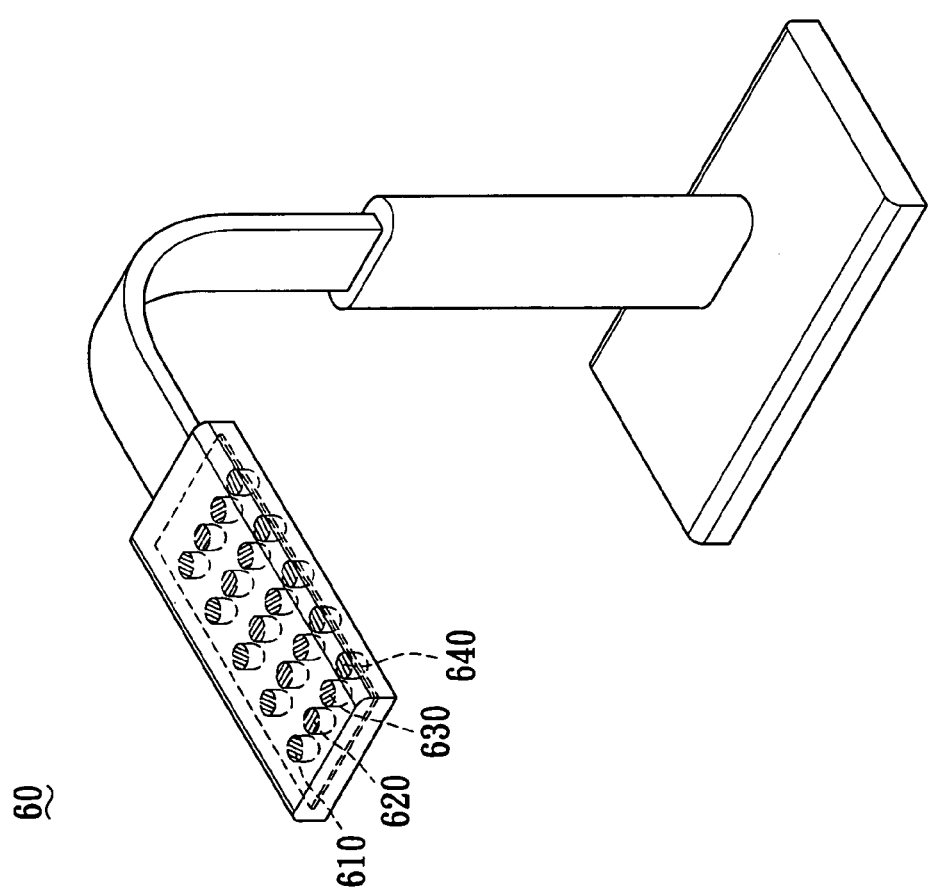
FIG. 6 shows a schematic diagram of a white light LED assembly according to the third preferred embodiment of the present invention.
Figure 8:
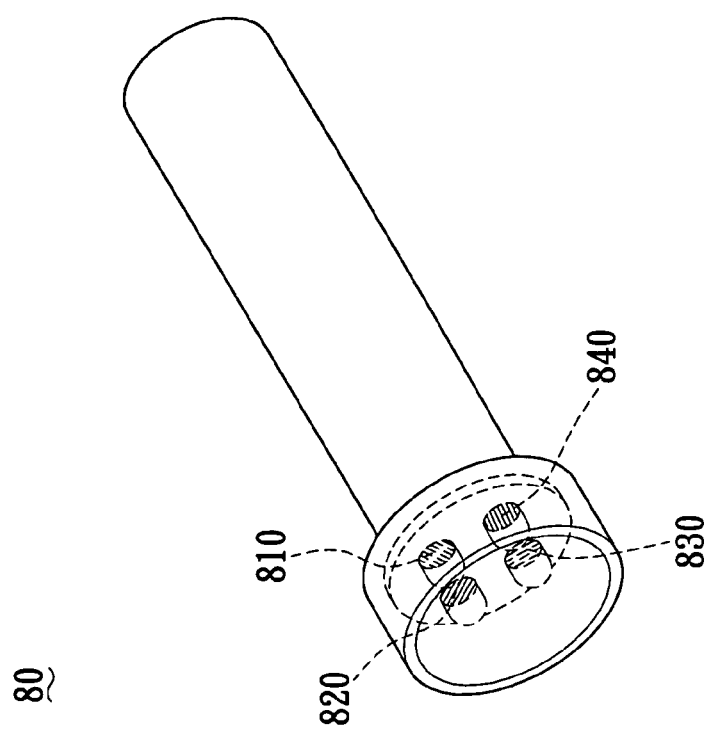
FIG. 8 shows a schematic diagram of a white light LED assembly according to the fifth preferred embodiment of the present invention.

FIGS. 6 and 7 show the application of the white light LED assembly according to the present invention to lamp such as a table lamp. In FIG. 6, the white light LED assembly 60 is arranged in multiple rows. In FIG. 7, the white light LED assembly 60 is arranged in single rows. FIG. 8 shows the application of the white light LED assembly according to the present invention in an electric lamp. In the above-mentioned three embodiments, the white light-emitting units can be selected from at least two out of the four kinds of light-emitting units as shown in the example shown in FIGS. 1 and 5.

To sum up, the white light LED assembly according to the present invention has satisfactory efficiency and color rendering property as well as flexible phosphor usage.

Although the present invention has been described with reference to the preferred embodiment thereof, it will be understood that the invention is not limited to the details thereof. Various substitutions and modifications have suggested in the foregoing description, and other will occur to those of ordinary skill in the art. For example, the controller can be incorporated with a memory unit for storing driving current data for each LED and the controller can be a controller IC. Therefore, all such substitutions and modifications are intended to be embraced within the scope of the invention as defined in the appended claims.

We claim:

1. A white light LED assembly comprising at least two kinds of light-emitting units selected from a group consisting of
   (a) a first white light-emitting unit composed of red, green and blue LEDs;
   (b) a second white light-emitting unit composed of a blue and yellowish-green LEDs;
   (c) a third white light-emitting unit composed of a blue LED and yellow phosphor; and
   (d) a fourth white light-emitting units composed of UV LED and red, green and blue phosphors.

2. The white light LED assembly as in claim 1, further comprising a controller to control a luminance of each LED in the white light LED assembly.

3. The white light LED assembly as in claim 2, wherein the controller has a memory unit for storing driving current data for each LED.

4. The white light LED assembly as in claim 2, wherein the controller is a controller IC.

5. The white light LED assembly as in claim 1, wherein the LEDs in the first white light-emitting unit are manufactured from InGaAlP, InGaN and Gap material.

6. The white light LED assembly as in claim 1, wherein the white light LED assembly comprises a first white light-emitting unit composed of red, green and blue LEDs, and a third white light-emitting unit composed of a blue LED and yellow phosphor.

7. The white light LED assembly as in claim 4, wherein the LEDs in the first white light-emitting unit are manufactured from InGaAlP, InGaN and Gap material.

8. The white light LED assembly as in claim 1, wherein the white light LED assembly can be applied in a lamp or LCD back light.

* * * * *